United States Patent Office 2,756,012
Patented July 24, 1956

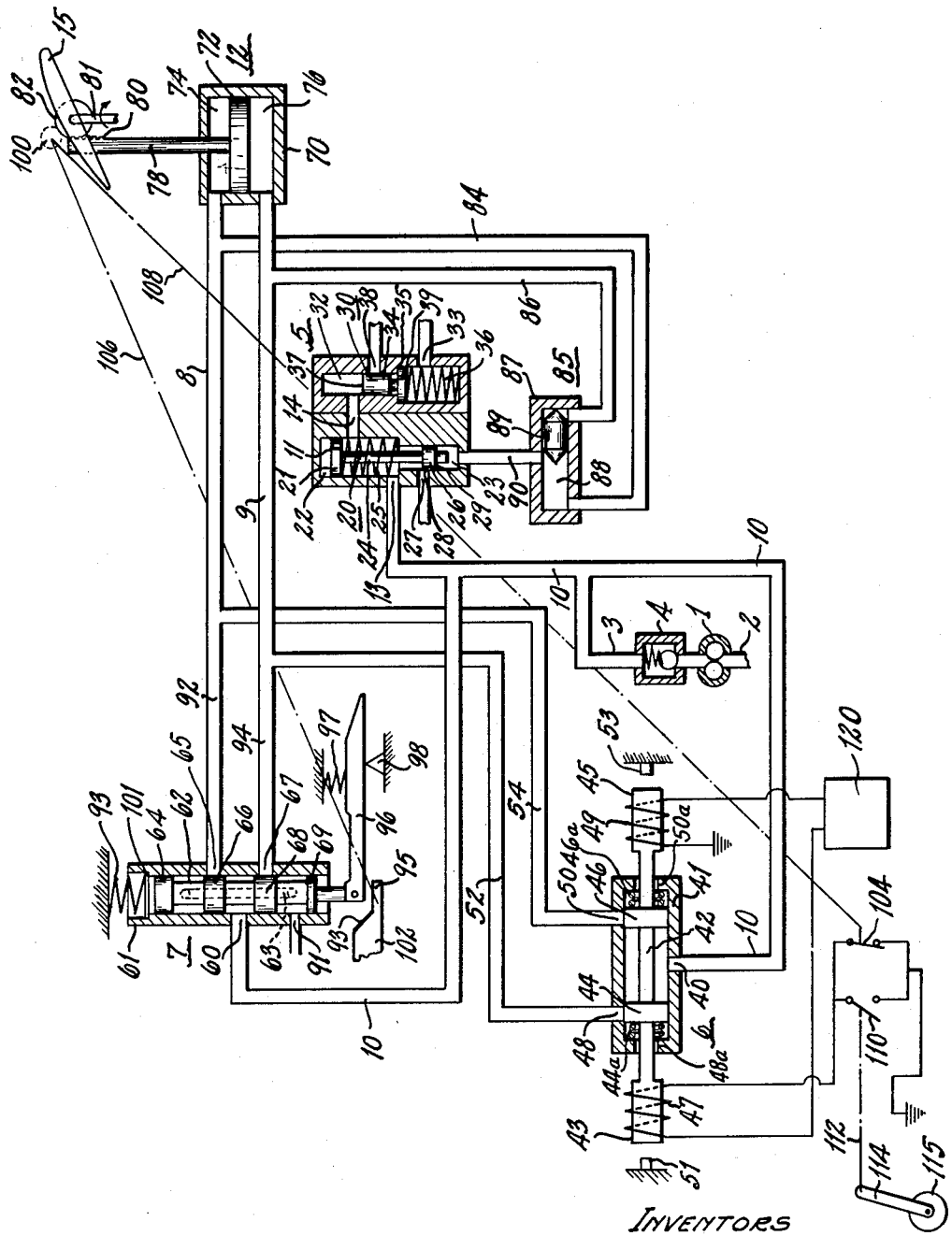

2,756,012
PROPELLER PITCH STOP CONTROL

Richard E. Moore, Harold H. Detamore, and Morton Brooks, Dayton, and Dale W. Miller, Brookville, Ohio, assignors to General Motors Corporation, Detroit, Mich., a corporation of Delaware Application January 16, 1952, Serial No. 266,756

6 Claims. (Cl. 244—81)

The present invention relates to a control system for variable pitch aircraft propellers and more particularly to a system for automatically controlling the movements of propeller blades actuated by fluid servomotors between different predetermined limits.

When an aircraft is in flight, the angular movement of the blades of a variable pitch propeller must be limited to a low angle that provides sufficient propulsive force to maintain the aircraft self-sustaining in the air. However, when the aircraft is on a landing surface, the minimum low angle of the blades for safety in flight may produce too great a propulsive force tending to move the aircraft. Hence, it is desirable to provide means for enabling angular movement of the blades to a lower angle setting to allow testing of the prime mover governing apparatus when the aircraft is on a landing surface, whether it be water, land or the deck of an aircraft carrier. Accordingly, one of our objects is to provide a control system for a variable pitch propeller incorporating means constituting two low pitch stops, and means for automatically determining which of the stops, the flight low pitch stop or the ground low pitch stop, will be effective to limit the range of blade movement.

The aforementioned and other objects are accomplished by providing a fluid pressure system including governor operated valve means that control the flow of fluid to and from fluid actuated motors for adjusting the blade angle to maintain a selected speed of propeller operation. Further, mechanism is provided for positioning part of the governor operated valve means so that it controls the fluid flow to the motors in a manner tending to increase the angular setting of the blades irrespective of the demand for a decrease angular setting called for by the governor if an angle below the predetermined flight low pitch stop is reached by the blades. Specifically, the fluid pressure system includes a source of regulated fluid pressure, fluid motors for adjusting the angular setting of the blades, and two valve controlled paths between the pressure source and the blade actuating motors for controlling the flow of fluid to and from the motors. The governor operated valve means includes a solenoid valve and a speed responsive valve. The solenoid valve is actuated by an electrical governor system outside of the propeller. The speed responsive valve is positioned in one of the paths between the pressure source and the motors, and establishes the high and the low speed limits of the governing range. The solenoid valve is in the other path between the pressure source and the motors, and is used as a precise control of propeller operation in the governing range between the speed limits established by the speed responsive valve.

A feedback mechanism associated with the propeller blades actuates a cam that positions the speed responsive valve so that it controls the flow of fluid to the motors in a manner tending to increase the angular setting of the blades if an angle lower than the flight low pitch stop is reached by the blades. Coincident with movement of the cam to position the speed responsive valve, the feedback mechanism also opens the ground connection to one solenoid winding so that the solenoid valve is unable to direct fluid to the motors in a manner tending to further decrease the angular setting of the blades. Thus, the fluid flight low pitch stop is provided by the speed responsive valve. However, the ground connection to the winding of the solenoid valve may be closed by landing gear actuated mechanism if the aircraft is on a landing surface. In this instance the solenoid valve may continue to direct fluid to the motors in a manner tending to further decrease the angular setting of the blades to the ground low pitch stop. The fluid ground low pitch is obtained by depressing the flight low pitch stop, established by the speed responsive valve, until the fluid flow from the speed responsive valve tending to increase the angular setting of the blades balances the flow of fluid from the solenoid valve tending to decrease the angular setting of the blades.

Further objects and advantages of the present invention will be apparent from the following description, reference being had to the accompanying drawing wherein a preferred embodiment of the present invention is clearly shown.

In the drawing:

The drawing represents a schematic view of the fluid circuit for the propeller control system. Referring more particularly to the drawing, system pump 1 operates continuously to supply fluid pressure to trunk line 10 during propeller rotation. The pump 1 has an inlet passage 2 and an outlet passage 3. The outlet passage 3 is connected to the trunk line 10 and is provided with a check valve 4 which prevents flow from line 10 back through the pump 1. Trunk line 10 communicates with a variable pressure regulating means 5, and governor operated valve means comprising a solenoid valve 6 and a speed responsive valve 7. The solenoid valve 6 and the speed responsive valve 7 have control ports which are connected to lines 8 and 9 that lead to opposite chambers of a fluid servomotor 12 that is provided with means for adjusting the angular setting of a propeller blade 15. The component parts of the fluid system are mounted within a regulator of the type shown in the Blanchard et al. Patents 2,307,101 and 2,307,102.

The fluid pressure in trunk line 10 is controlled by the pressure regulating means 5 which embodies an equal area valve 20 and a pressure relief valve 30. The equal area valve 20 is housed in chamber 22 of the pressure regulating means 5 and comprises a plunger 24 urged by a spring 25 toward the upper end of the chamber in which position, land 26 of the plunger tends to close a relief port 27. When relief port 27 is open, the pressure in chamber 22 and in trunk line 10 is reduced. Trunk line 10 is connected to port 13 of the equal area valve 20, the port 13 communicating with chamber 22. Fluid pressure in chamber 22 tends to move the plunger 20 so that land 26 will open port 27 by acting on surface 28 of the land 26. However, port opening movement of the plunger 24 is opposed by the combined forces of spring 25 and centrifugal force which act to thrust the plunger upwardly in which position, land 26 closes the port 27. A second surface 29 of land 26 is exposed to the fluid pressure in chamber 23. The opposed surface areas of land 26, exposed to pressures existing in chambers 22 and 23 respectively, are equal. This requires pump 1 to operate at a pressure equivalent to the load of spring 25 and centrifugal force acting on the plunger plus the pressure in chamber 23. Piston member 21 apertured at 11 acts as a dashpot to damp the movements of the plunger 24.

Pressure relief valve 30 is housed in chamber 32 of the pressure regulating means 5, chambers 22 and 32 being connected by passage 14. The pressure relief valve 30 comprises a piston valve 34 urged upwardly by a spring 36 acting on flanged member 35 and by centrifugal force. Piston 34 ordinarily covers exhaust port 38 which is connected to drain when the fluid pressure acting on surface 37 of the piston overcomes the thrust of spring 36 and centrifugal force. The piston 34 and port 38 combined represent a pressure relief valve mechanism that limits the maximum pressure of the system. Flanged member 35 is provided with a passage 39 through which fluid trapped between piston 34 and flanged member 35 may drain through port 33.

Trunk line 10 is connected to supply port 40 of the solenoid actuated valve 6 and control port 60 of the speed responsive valve 7. The solenoid valve 6 controls the flow of fluid to and from servomotor 12 through one path and the speed responsive valve 7 controls the flow of fluid to and from the servomotor through a second path. The solenoid actuated valve comprises a spool valve 42 having spaced lands 44 and 46 which control the flow of fluid through control ports 48 and 50 respectively. Spool valve 42 is housed in a valve guide 41 and is provided at each end with armatures 43 and 45 respectively. The valve guide 41 is formed with drain ports 48a and 50a, and contains centering springs 44a and 46a. Solenoid windings 47 and 49 cooperate with armatures 43 and 45 respectively and when these windings are alternately energized, the spool valve 42 will move between the limits defined by stops 51 and 53. The solenoid windings are energized by an electrical governor system, designated generally by 120, outside of the propeller. The electrical system may be of the type disclosed in Serial No. 94,984, Dinsmore et al., now U. S. Patent No. 2,669,312, and is used as a precise control of propeller operation in the governing range between the speed limits established by the speed responsive valve 7. In this tye of precise control, the windings 47 and 49 of the solenoid valve 6 are alternately energized for time periods of equal duration when the propeller is operating at the selected speed. However, when an off-speed occurs, the solenoid windings are differentially energized for time periods of unequal duration, and if the off-speed is of sufficient magnitude, one of the windings may be continually energized and the other winding continually deenergized.

Control port 48 of the solenoid valve 6 is connected by a line 52 to line 9 and control port 50 is connected by means of line 54 to line 8. The blade actuating servomotor 12 comprises a cylinder 70 and a piston 72 which divides the cylinder into an increase pitch chamber 74 and a decrease pitch chamber 76. The piston 72 is connected by means of rod 78 to rack 80 which meshes with pinion gear 82. Pinion gear 82 is attached to the blade 15 and rotation of pinion 82 by means of rack 80 causes the blade 15 to assume different angular settings. Shaft 81 rotates the blade 15 in the direction suggested by the arrow. It is to be understood that each blade of the variable pitch propeller is provided with a similar servomotor and actuating mechanism for adjusting the angular setting of the blades. Line 8 communicates with the increase pitch chamber 74 of the servomotor and line 9 communicates with the decrease pitch chamber 76 of the servomotor.

Lines 84 and 86 communicate, respectively, with lines 8 and 9. Lines 84 and 86 lead to opposite sides of a shuttle valve 85 which comprises a valve casing 87 having a chamber 88 in which shuttle valve member 89 is adapted to be moved under the urge of fluid pressure in either of the lines 84 or 86. Fluid pressure from lines 8 or 9 will, thus, be transmitted to opposite sides of the shuttle valve member 89 and whichever of the pressures in lines 8 or 9 is the greater will be transmitted to chamber 23 of the pressure regulating means 5 through line 90. The pressure from either of lines 8 or 9, which is transmitted through the shuttle valve 85 to chamber 23, acts on surface 29 of the equal area valve 20 to assist the forces of the spring 25 and centrifugal force that tend to move plunger 24 upwardly so that land 26 will tend to close port 27.

Thus, the demand for fluid pressure by the servomotor 12 is transmitted to the equal area valve 20 to actuate the equal area valve so that the pressure requirements of the servomotor 12 in carrying out its control function will be met by the pump 1.

The speed responsive valve 7 is used to establish the high and low speed limits of the governing range. This valve is housed in a valve guide 61 and comprises a plunger 62 having spaced lands 64, 66, 68 and 69. Lands 66 and 68 cooperate respectively with control ports 65 and 67 which are connected by means of lines 92 and 94 to lines 8 and 9, respectively. The plunger 62 is provided with an axial bore 63 which communicates at one end with the annular channel between lands 64 and 66 and at the other end between lands 68 and 69. The annular channel between lands 68 and 69 also communicates with a port 91 which is connected to drain. The plunger is pivoted to lever 96, the lever having a fixed fulcrum at 98, and a spring 97 is positioned between the fulcrum 98 and the pivotal connection to plunger 62. The speed responsive valve is, in essence, an over-speed and an under-speed governor valve. The width of lands 66 and 68 is somewhat greater than the width of control ports 65 and 67 so that small off speeds will not cause the speed responsive valve to direct fluid to the servo motor 12, thereby allowing the electrical governor operated solenoid valve to act as a precise control of propeller speed. The high speed limit is established by the force of spring 93 acting on the surface of plate 101, which engages the end surface of land 64 when centrifugal force moves the plunger 62 upwardly. If the thrust of centrifugal force is greater than the thrust due to the force of spring 93, plunger 62 will move upwardly so that land 66 will open port 65 to the annular channel between lands 66 and 68 which communicates with pressure port 60 and trunk line 10. In this instance, fluid pressure will be transmitted through lines 92 and 8 to the increase pitch chamber 74 of the servo motor 12. Decrease pitch chamber 76 will at this time be connected to drain through lines 9 and 94, and ports 67 and 91 of the speed sensitive valve 7. The piston 72 will then be actuated to move blade 15 to an increase pitch position which will correct the over-speed. The low speed limit is established by a stop 95 that limits the downward movement of the plunger 62 under the urge of spring 97 as opposed by centrifugal force. When an under-speed condition exists, pressure fluid in the annular channel between lands 66 and 68 will be transmitted to the decrease pitch chamber 76 of the servo motor through line 94 and line 9. At this time, increase pitch chamber 74 will be opened to drain through lines 8 and 92, port 65, passage 63 and port 91 of the speed responsive valve. During propeller operation within the high and low speed limits, the lever and plunger will assume a position where lands 66 and 68 close ports 65 and 67, under the urge of centrifugal force as opposed by the spring 97 acting on the lever 96.

When the propeller is operating between the high and low speed limits established by the speed responsive valve, the electrical governor 120 will maintain propeller operation at any selected speed within these limits. If an offspeed occurs, the windings of solenoid valve 6 will be differentially energized, depending on the character and amount of the offspeed. Energization of winding 47 of the solenoid valve 6 will move the spool valve 42 to a position where port 48 will be in communication with the annular channel between lands 44 and 46 that is connected to supply port 40. When the spool valve is in this position, pressure fluid will be supplied to the decrease pitch chamber 76 of the servomotor, and increase pitch chamber 74 will be opened to drain through lines 8 and 54, and port 50 of the solenoid valve 6. When winding 49 of the solenoid valve is energized, the opposite conditions are true, i. e. increase pitch chamber 74 will be supplied with pressure fluid and decrease pitch chamber 76 will be opened to drain through lines 8 and 54, and port 48 of the solenoid valve. Angular movements of the blade 15 are transmitted by means of a feedback mechanism comprising pinion gear 100 which meshes with blade gear 82 and mechanical linkages 106 and 108 to a cam 102 and to a switch 104, respectively. Cam 102 will be moved to the right, as viewed in the drawing, to a position where the inclined surface 93 will engage the lever 96 that is pivoted to the speed responsive valve plunger 62 when blade 15 is moved towards a low angle setting. If the blade 15 is moved to a predetermined low angle setting, for example positive 10°, surface 93 of the cam 102 will move plunger 62 upwardly so that land 66 will tend to open port 65 to the trunk line pressure supplied to port 60. Thus, one of the low angle settings, namely the flight low pitch stop, is established by the speed responsive valve 7. Coincident with movement of cam 102 by the feedback linkage 106, feedback linkage 108 will open switch 104 to prevent energization of winding 47 of the solenoid valve 6. Thus, even though the electrical governor may call for a decreased angular setting of the blade 15 to maintain the selected speed of propeller operation, the blade 15 cannot be moved to a lower angular setting than a predetermined low angle when the aircraft is in flight. If the angular setting of the blades is decreased below the flight low angle, the feedback linkage 106 will cause cam 102 to position the speed sensitive valve plunger 62 in a manner tending to control the flow of fluid to increase the angular setting of the blades. The angular setting of blade 15, which will position valve plunger 62 so that any lesser blade angle will cause the plunger to be moved to a position where it will direct fluid flow to increase the angular setting of the blades, is termed a flight low pitch stop which represents the minimum safe low blade angle that provides sufficient propulsive force to maintain the aircraft self-sustaining in flight.

When the aircraft is on a landing surface, it is necessary to move the blades to a second low angular setting to allow testing of the prime mover governing apparatus without producing too great a propulsive force tending to move the aircraft. In order to reduce the angular setting of the blades below the flight low pitch stop constituted by the speed responsive valve and actuated by the associated feedback actuated cam, a second switch 110 is provided to permit energization of winding 47 of the solenoid valve when the aircraft is on a landing surface. The second switch 110 is moved to the closed position by mechanical linkage 112 actuated by the landing gear 114 whenever the aircraft wheel 115 associated with the landing gear contacts a landing surface. If the aircraft is adapted for landing on water, any suitable hydrostatic switch actuating mechanism may be used to replace the landing gear linkage for actuating the switch 110. Switches 104 and 110 are in parallel and control the connection of winding 47 to ground. When the aircraft is on a landing surface and switch 110 is closed, the solenoid valve 42 may be moved to a position calling for a decrease blade angle under the control of the electrical governor system below the flight low pitch stop established by the speed responsive valve 7. When these conditions exist, fluid pressure from trunk line 10 will be supplied through ports 40 and 48 of the solenoid valve to the decrease pitch chamber 76 of the servomotor 12 through lines 52 and 9. However, blade angle movement below the flight low pitch stop will cause feedback linkage 106 to move cam 102 to the right where it will move plunger 62 upwardly to supply fluid pressure from trunk line 10 to ports 60 and 65 of the speed responsive valve to the increase pitch chamber 74 through lines 92 and 8. Movement of the servomotor piston 72 and, hence, the blade 15 will be stopped at a second predetermined low angle setting, for example positive 5°, which is established when the fluid flow to the increase pitch chamber 74 balances the fluid flow to the decrease pitch chamber 76. That is, when the fluid flow through ports 40 and 48 of the solenoid valve, and lines 52 and 9 to chamber 76 on the servomotor, is equal to the fluid flow through ports 60 and 65 of the speed responsive valve, and lines 92 and 8 to chamber 74 of the servomotor. The second low angular setting to which the blades are movable, is termed the ground low pitch stop and is obtained by reason of the solenoid valve depressing the flight low pitch stop established by the speed responsive valve. In propeller control systems of the type disclosed in the aforementioned copending application, Serial No. 94,984, the overspeed-underspeed centrifugally actuated governor valve 7, is merely employed as a stand-by governor or safety means. That is, the governor valve assembly 7 only controls the flow of fluid to the servomotor 12 when the offspeed experienced by the propeller exceeds the governor setting within which the solenoid valve 6 is operable to control propeller speed by adjusting propeller pitch. However, the valve 7, by reason of its construction is operable to override the effects of the solenoid valve 6. That is, the governor valve 7 is operable to supply greater quantities of pressure fluid when the ports thereof are wide open, than can the solenoid valve 6. Moreover, by reason of the larger port openings in the valve 7, the pressure potential of fluid flowing from valve 7 to the motor 12 is greater than the pressure potential of fluid flowing from the solenoid valve 6. This result necessarily follows since a pressure drop across an orifice is inversely proportional to the size of the orifice. Accordingly, even though port 48 of the solenoid valve 6 is fully open to the pressure port 40, whereby pressure fluid is applied to the decrease pitch chamber 76, while the increase pitch chamber 74 is connected to drain through port 50, the application of greater quantities of fluid under a greater pressure through port 65 to the increase pitch chamber 74, while decrease pitch chamber 76 is connected to drain through port 67 will be operable to effectively preclude movement of the piston 72 and the blade 15 below the ground low pitch stop angle.

In operation the blade 15 may be adjusted to an angular setting called for by the governor to any position between the flight low pitch stop and a maximum pitch angle when the aircraft is airborne. However, should the electrical governor call for a blade angle lower than the flight low pitch stop when the aircraft is in flight, the feedback mechanism actuating linkage 108 will render the electrical governor inoperative to decrease the angular setting of the blades below the flight low pitch stop position, by rendering the solenoid valve inoperative to direct fluid flow to the decrease pitch chamber. When the aircraft is on a landing surface, the blade 15 may be moved to any position within the range between the ground low pitch stop and the maximum pitch angle due to the closing of landing gear actuated switch 110 which renders the solenoid valve operative to depress the flight low pitch stop established by the speed responsive valve, if it is energized by the electrical governor.

While the embodiment of the present invention as herein disclosed, constitutes a preferred form, it is to be understood that other forms might be adopted, all coming within the scope of the claims which follow.

What is claimed is as follows:

1. Automatic means for establishing either of two low angle stops for blades of a variable pitch aircraft propeller of the type having fluid actuated motors for adjusting the angular setting of the blades including, in combination, a source of fluid pressure, two independent valve controlled paths connecting said source and said motors, a speed responsive valve in one of said paths, a solenoid actuated valve in the other of said paths, an electrical governor for controlling the movements of the solenoid valve, a feedback mechanism actuated by movements of the blades, means operated by the feedback mechanism for rendering the solenoid actuated valve inoperative to decrease blade angle and for coincidentally positioning said speed responsive valve when a predetermined low angle has been reached by the blades, said speed responsive valve, when so positioned, being operative to effect a fluid stop for said blades when the aircraft is in flight, and landing gear actuated mechanism for rendering the solenoid actuated valve operative to decrease the angle of the blades below the fluid flight stop to a second fluid stop when the aircraft is on the ground, said ground fluid stop being determined by equality between fluid flow tending to increase the blade angle controlled by said speed responsive valve and fluid flow tending to decrease the blade angle controlled by the solenoid valve.

2. In a variable pitch aircraft propeller having a first low pitch stop that prevents blade movements below a predetermined minimum safe low angle when the aircraft is in flight, the combination including, a source of fluid pressure, a fluid servomotor for adjusting blade angle, governor operated valve means for controlling fluid flow to and from said motor, means including a part of said governor operated valve means constituting said first low pitch stop, and means including landing gear operated mechanism and a part of said governor operated valve means for overriding said first stop and to establish a second low pitch stop determining a lower angle to which the blades are movable when the aircraft is on a landing surface.

3. In a variable pitch aircraft propeller having a first low pitch stop that prevents blade movements below a predetermined minimum safe low angle when the aircraft is in flight, the combination including, a source of fluid pressure, a fluid servo motor for adjusting blade angle, governor operated valve means for controlling fluid flow to and from said motor, means including a part of said governor operated valve means constituting said first low pitch stop, a feedback mechanism actuated by the blades during movements thereof, said feedback mechanism being operatively connected to said part for positioning the same to actuate said stop when the minimum safe low flight angle has been reached by the blades, and means including a part of said governor operated valve means for overriding said first stop and to establish a second low pitch stop determining a lower angle to which the blades are movable when the aircraft is on a landing surface.

4. In a variable pitch aircraft propeller having a first low pitch stop that prevents blade movements below a predetermined minimum safe low angle when the aircraft is in flight, the combination including, a source of fluid pressure, a fluid servomotor for adjusting blade angle, governor operated valve means for controlling fluid flow to and from said motor, said governor operated valve means including a speed responsive valve and a solenoid actuated valve in parallel paths between said source and said servomotor, means including a feedback mechanism actuated by the blades for positioning said speed responsive valve to actuate said first low pitch stop, and means including the solenoid actuated valve for overriding said first stop and to establish a second low pitch stop determining a lower angle to which the blades are movable when the aircraft is on a landing surface.

5. In a variable pitch aircraft propeller having a first low pitch stop that prevents blade movements below a predetermined minimum safe low angle when the aircraft is in flight, the combination including, a source of fluid pressure, fluid servomotors for adjusting the blade angle, governor operated valve means for controlling fluid flow to and from said motors; means constituting said first low pitch stop including a part of said governor operated valve means, a blade actuated feedback linkage, and means connected to and moved by said linkage for positioning said part of said governor operated valve means to actuate said stop when the minimum safe low flight angle has been reached by the blades; and means including landing gear operated mechanism for overriding said first stop and to establish a second low pitch stop determining a lower angle to which the blades are movable when the aircraft is on a landing surface.

6. In a variable pitch aircraft propeller having a first low pitch stop that prevents blade movements below a predetermined minimum safe low angle when the aircraft is in flight, the combination including, a source of fluid pressure, fluid servomotors for adjusting the blade angle, governor operated valve means for controlling fluid flow to and from said motors, said governor operated valve means including a speed responsive valve and a solenoid actuated valve in parallel paths between said source and said servomotors, an electrical governor controlling the movements of the solenoid valve, means constituting said first low pitch stop, said means including a feedback mechanism actuated by the blades, and a first solenoid valve switch operable by said mechanism, said feedback mechanism positioning said speed responsive valve to actuate said stop and coincidentally moving the first switch to the open position to prevent energization of said solenoid valve to decrease blade angle when the minimum safe low flight angle has been reached by the blade, and means for overriding said first stop and to establish a second low pitch stop determining a lower angle to which the blades are movable when the aircraft is on a landing surface, said overriding means including a landing gear operated linkage, a second solenoid valve switch connected to and moved by said linkage, and said solenoid valve, said linkage moving the second switch to the closed position to permit energization of the solenoid valve to decrease blade angle by the electrical governor when the aircraft is on a landing surface.

References Cited in the file of this patent

UNITED STATES PATENTS

| | | |
|---|---|---|
| 2,402,065 | Martin | June 11, 1946 |
| 2,504,209 | Martin | Apr. 18, 1950 |
| 2,513,660 | Martin | July 4, 1950 |
| 2,593,910 | Morris et al. | Apr. 22, 1952 |
| 2,594,927 | Holt | Apr. 29, 1952 |
| 2,640,555 | Cushman | June 2, 1953 |